E. G. LA BLANC.
CLUTCH LOCK.
APPLICATION FILED MAR. 4, 1922.
1,434,494.
Patented Nov. 7, 1922.
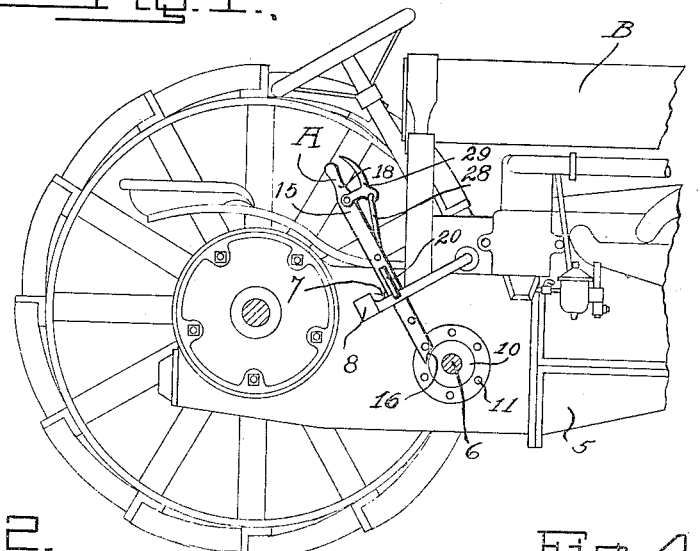
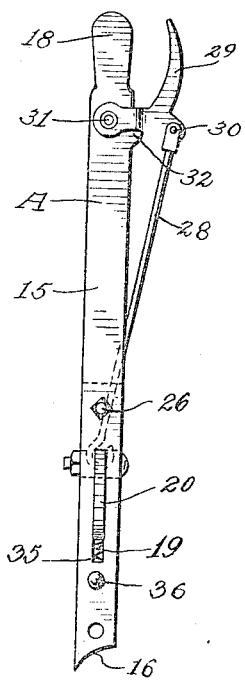
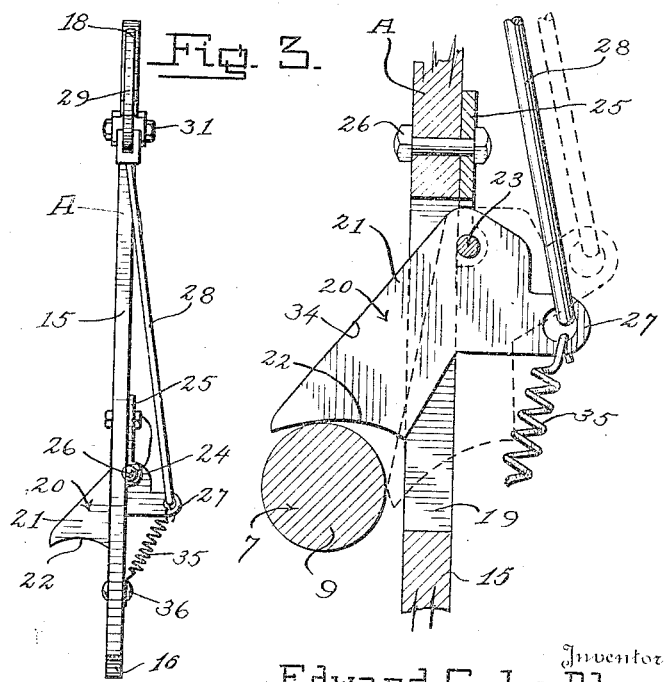
Inventor
Edward G. La Blanc Patented Nov. 7, 1922.

1,434,494

UNITED STATES PATENT OFFICE.

EDWARD G. LA BLANC, OF OSSEO, WISCONSIN.

CLUTCH LOCK.

Application filed March 4, 1922. Serial No. 541,094.

*To all whom it may concern:*

Be it known that I, EDWARD G. LA BLANC, a citizen of the United States, residing at Osseo, in the county of Eau Claire and State of Wisconsin, have invented certain new and useful Improvements in Clutch Locks, of which the following is a specification.

This invention relates to attachments for motor vehicles of the tractor type and the primary object of the invention is to provide a novel means for holding the clutch lever of a tractor in a lowered position with the clutch disengaged, thereby eliminating the necessity of holding the clutch down manually, during the cranking operation or when it is desired to allow the belt pulley to run idle when doing belt work.

A further object of the invention is the provision of a lever removably secured to the tractor having novel means carried thereby for engaging a clutch lever, when the same is in its lower position, to hold the same against upward movement, and novel means for moving said clutch lever engaging means out of the path of the clutch lever when it is desired to allow the lever to return to its normal raised position.

A still further object of the invention is to provide a novel means for automatically holding a clutch lever in its lowered position of the above character, which will be durable and efficient in use, one that will be simple and easy to manufacture, and one which can be placed upon the market and incorporated with a tractor at a low cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a fragmentary side elevation of the tractor partly in section showing the improved clutch lock incorporated therewith.

Figure 2 is a side elevation of the clutch lock removed from the tractor.

Figure 3 is an edge elevation of the improved clutch lock removed from the tractor, and Figure 4 is an enlarged fragmentary vertical longitudinal section through the improved clutch lock showing the position of the locking member in full lines for holding a clutch lever in its lowered position, the clutch lever being shown in section and showing the position of the locking member in dotted lines when moved out of engagement with the clutch lever.

Referring to the drawings in detail, wherein similar reference characters designate corresponding parts throughout the several views, the letter A indicates the improved clutch lock attachment for a tractor B.

The tractor B may be of any preferred character, and the improved attachment A can be used with any type of tractor embodying a clutch lever. The same has been primarily constructed, however, for use with tractors of the "Fordson" type and the tractor illustrated in the drawings is of this type.

The tractor B as shown, includes the usual case 5 which forms the frame of the tractor, the pulley drive shaft 6, and the clutch pedal or lever 7. The pedal or lever 7 includes the foot rest or stirrup portion 8 and the shank portion 9. The pulley drive shaft 6 is rotatably mounted in the usual manner in the bearing 10 provided for that purpose, which can be bolted as at 11 to the case 5.

The improved lock A for the pedal 7 comprises a lever or upright 15. The lower end of this lever is cut arcuately as at 16 to conform to the configuration of the attaching flange carried by the bearing 10 of the pulley drive shaft 6. The lever 15 may be provided with a bolt opening 17 through which one of the bolts 11 may be extended. Thus it can be seen that the bolts 11 can also be utilized for holding the lever or upright 15 in position as well as the bearing 10 for the pulley drive shaft 6. This means of connecting the lever in position allows a limited swinging movement thereof for a purpose which will be hereinafter more fully described.

The upper end of this lever or upright 15 is shaped to provide a hang grip 18 as clearly shown in Figures 1 and 2 of the drawings. Adjacent to its lower end, the lever or upright 15 is provided with a longitudinally disposed slot 19, through which the locking member 20 for the clutch pedal or lever 7 is adapted to extend.

The locking member 20 includes a flat body portion 21, the lower end of which may be curved arcuately as at 22 for engaging the upper surface of the shank portion 9 of the foot pedal 7. The upper end of the body 21 is provided with an opening for the reception of a pivot pin 23, which is rotatably mounted in a barrel 24 carried by a bracket 25, which can be bolted or otherwise secured as at 26 to the lever or upright 15. An outwardly extending eye 27 is formed on the rear edge of the plate 21, and this eye receives the lower end of the connecting rod 28, the upper end of which is pivotally connected to the lock operating member 29, as at 30. This lever 29 will oscillate and the operating member 29 is pivotally connected to the lever or upright 15 directly below the handle portion 18 thereof by means of a pivot pin 31. The lever 15 also below the pivot pin 31 is provided with an outstanding limiting lug 32, which is disposed in the path of the operating member 29 in order to limit the movement thereof in a downward direction, the purpose of which will be hereinafter more fully described.

In operation of the improved clutch pedal lock, when it is desired to lock the pedal, in its lowered position with the clutch thrown in, it is merely necessary to depress the pedal toward its lower position. The shank portion 9 of the pedal, riding upon the inclined inner edge 34 of the locking plate 20 will swing the same inwardly, and as the pedal rides below the same, the plate will be automatically moved back to its normal position in the path of the pedal 7, by means of a contractile coil spring 35, which is secured respectively to the eye 27 and to a bolt 36 carried by the lever or upright 15 adjacent to the lower end thereof. The pedal 7 then rests in the path of the lower face 22 of the locking member 20 and is positively held against upward movement by said plate, and it is obvious that the plate is held from swinging movement in an upward direction by the fact that the operating member 29 engages the limiting shoulder 32. Thus it can be seen that the clutch lever can be held down in its lowered position in order to effectively hold the clutch out, thereby permitting the convenient cranking of the machine and the convenient disconnection of the pulley when the tractor is being used for belt work without necessitating the holding down of the pedal by the foot of the operator. The uses for the improved clutch pedal lock are unlimited, and various uses thereof will readily suggest themselves to persons conversant with the use of tractors of this character. When it is desired to permit the pedal to return to its normal position, it is merely necessary to grip the handle portion 18 of the lever 50 and the operating portion 29. This will draw up on the road 28 and swing the plate or locking member 20 on the pivot pin 23 and move the same to the lower end of the frame downward below the clutch pedal 7, allowing the same to automatically return to its normal position. If difficulty is experienced in swinging the plate 21 on the pivot 23 in order to move the same out of the path of the pedal 7, it is merely necessary to depress the pedal slightly manually before operating the operating portion 29.

As stated, the means of securing the lever 15 in position permits a limited swinging movement thereof, thereby allowing the lever to be moved forward to permit the foot pedal 7 to be held in a further depressed position and allowing the lever to be swung rearwardly a slight distance to give greater clearance for the foot pedal.

From the foregoing description, it can be seen that an improved clutch pedal lock has been provided of exceptionally simple and durable construction, which will function in easy manner so that the same can be operated by the ordinary layman.

Changes in details may be made without departing from the spirit or scope of this invention; but,

I claim:

1. In a motor vehicle, the combination with a motor driven shaft, clutch means between the motor and shaft, and a pedal for operating said clutch to release the shaft from the motor, of an attachment for automatically locking the clutch pedal in its lowered position including a lever secured to the tractor, a locking plate pivotally carried by the lever and arranged to be normally held in the path of the clutch pedal.

2. In a tractor, the combination with a motor driven shaft, clutch means between the motor and shaft, a pedal for operating said clutch to release the shaft from the motor, of means for automatically holding the clutch pedal in lowered position including an attaching supporting lever secured to the tractor, a locking plate pivotally secured to the lever, spring means normally holding the locking plate in the path of the pedal, and an operating member pivotally carried by the upper end of the lever operatively connected with said locking plate.

3. In a tractor, the combination with a motor, a shaft, clutch means between the motor and shaft, and a pedal for operating said clutch, of locking means for holding the clutch pedal in a lowered position comprising an upright lever secured to the tractor, a locking plate pivotally secured adjacent to its upper end to the lever, and including a lower arcuate face for engaging the pedal, and an inclined inner face adapted to be engaged by the pedal when the pedal is being moved to its lowered position, an operating handle pivotally secured to the upper end of the lever, means for limiting the downward movement of the operating handle, and a connecting rod pivotally secured to the operating handle and to the locking plate.

4. In a tractor, the combination with a motor, a shaft, clutch means between the motor and shaft, and a clutch pedal for operating said clutch to release the shaft from the motor, of an attachment for locking the clutch pedal in a lowered position including an upright lever, means securing the lever at its lower end to the tractor, the lever having a longitudinally disposed slot formed therein, a locking plate arranged to extend through said slot having a lower arcuate face for engaging the clutch pedal when the same is in its lowered position, an inner inclined face adapted to be engaged by the clutch pedal when the same is being moved to its lowered position, and an attaching eye disposed on the opposite face of the locking plate from the inclined face, and a bearing plate secured to the lever, means pivotally securing the locking plate to the bearing plate, an operating handle pivotally secured to the lever adjacent to its upper end, means for limiting the downward movement of the handle on said lever, and a rod pivotally connected to the operating handle and to said eye.

EDWARD G. LA BLANC.